US012062829B2

(12) United States Patent
Kim et al.

(10) Patent No.: US 12,062,829 B2
(45) Date of Patent: Aug. 13, 2024

(54) COOLING DEVICE FOR ANTENNA APPARATUS

(71) Applicant: KMW INC., Hwaseong-si (KR)

(72) Inventors: Duk Yong Kim, Yongin-si (KR); Jin Soo Yeo, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 196 days.

(21) Appl. No.: 17/752,871

(22) Filed: May 25, 2022

(65) Prior Publication Data

US 2022/0285820 A1 Sep. 8, 2022

Related U.S. Application Data

(63) Continuation of application No. PCT/KR2020/016769, filed on Nov. 25, 2020.

(30) Foreign Application Priority Data

Nov. 25, 2019 (KR) ........................ 10-2019-0151879
Nov. 25, 2020 (KR) ........................ 10-2020-0159452

(51) Int. Cl.
*H01Q 1/02* (2006.01)
*H05K 7/20* (2006.01)

(52) U.S. Cl.
CPC .................................... *H01Q 1/02* (2013.01)

(58) Field of Classification Search
CPC .................................. H01Q 1/02; H05K 7/20
(Continued)

(56) References Cited

U.S. PATENT DOCUMENTS 5,397,919 A * 3/1995 Tata .................... H01L 23/4093 257/E23.084
5,490,558 A * 2/1996 Akachi ............... H01L 23/3677 174/16.3

(Continued)

FOREIGN PATENT DOCUMENTS

CN 104053342 A 9/2014
JP H02-73697 A 3/1990

(Continued)

OTHER PUBLICATIONS

KR-20100039719-A English translation (Year: 2010).*

(Continued)

*Primary Examiner* — Anatoly Vortman
(74) *Attorney, Agent, or Firm* — Insight Law Group, PLLC; Seung Lee

(57) ABSTRACT

The present invention relates to a cooling device for an antenna apparatus. Particularly, the cooling device comprises a heat-dissipating cover which has an inner surface exposed to a thermal space and an outer surface exposed to the outside where outside air flows, and multiple wave heat-dissipating fins which are disposed in multiple rows on the outer surface of the heat-dissipating cover so as to be thermally conductive, and form curved surfaces that are continuous from the outer surface of the heat-dissipating cover to a discretionary height, in which the horizontal cross-sections at the discretionary height have straight-line shapes in which same are rotated by a predetermined angle
(Continued)

in any one direction from the horizontal cross-sections on the outer surface of the heat-dissipating cover. Therefore, the present invention provides the advantage of enhancing heat-dissipating performance.

10 Claims, 13 Drawing Sheets

(58) Field of Classification Search
USPC .......................................................... 361/704
See application file for complete search history.

(56) References Cited

U.S. PATENT DOCUMENTS

| | | | | | |
|---|---|---|---|---|---|
| 6,053,240 | A * | 4/2000 | Johnston | H01L 23/3677 | 257/722 |
| 6,469,898 | B1 * | 10/2002 | Rouchon | H01L 23/3677 | 174/16.3 |
| 6,664,928 | B2 | 12/2003 | Ogawa et al. | | |
| 2003/0131970 | A1 * | 7/2003 | Carter | B21C 23/14 | 257/722 |
| 2003/0150596 | A1 * | 8/2003 | Chen | H01L 23/3672 | 257/E23.099 |
| 2004/0261975 | A1 * | 12/2004 | Kozyra | H01L 23/467 | 165/185 |
| 2006/0201180 | A1 * | 9/2006 | Kidwell | F24T 10/17 | 165/45 |
| 2007/0131386 | A1 * | 6/2007 | Tsai | H01L 23/3677 | 257/722 |
| 2011/0103011 | A1 * | 5/2011 | Koplow | H05K 7/20163 | 165/185 |
| 2012/0320523 | A1 * | 12/2012 | Murakami | H01L 23/3677 | 165/185 |
| 2023/0327327 | A1 * | 10/2023 | Kim | H01Q 1/1228 | 343/702 |

FOREIGN PATENT DOCUMENTS

| | | | | |
|---|---|---|---|---|
| JP | H09-252066 | A | | 9/1997 |
| JP | 2002329821 | A | * | 11/2002 |
| JP | 2015-211056 | A | | 11/2015 |
| KR | 20-0241122 | Y1 | | 10/2001 |
| KR | 20100039719 | A | * | 4/2010 |
| KR | 10-1610044 | B1 | | 4/2016 |
| KR | 10-2016-0121491 | A | | 10/2016 |

OTHER PUBLICATIONS

JP-2002329821-A English translation (Year: 2002).*
International Search Report mailed Mar. 2, 2021 for International Application No. PCT/KR2020/016769 and its English translation.
Extended European Search Report mailed Nov. 17, 2023 from the European Patent Office for European Application No. 20892918.2.

* cited by examiner

*PRIOR ART*

COOLING DEVICE FOR ANTENNA APPARATUS

CROSS-REFERENCE TO RELATED APPLICATIONS

This application is a Continuation of International Application No. PCT/KR2020/016769, filed on Nov. 25, 2020, which claims the benefit of and priority to Korean Patent Application Nos. 10-2019-0151879, filed on Nov. 25, 2019; and 10-2020-0159452, filed on Nov. 25, 2020, the disclosure of which are herein incorporated by reference in their entirety.

TECHNICAL FIELD

The present invention relates to a cooling device for an antenna apparatus, and more particularly, to a cooling device for an antenna apparatus, which is capable of improving heat-dissipating performance by making a flow of outside air smooth.

BACKGROUND ART

A distributed antenna system is an example of a relay system for relaying communication between a base station and a user terminal. The distributed antenna system is used to expand service coverage of a base station in order to provide mobile communication service up to a shadow area that necessarily occurs indoors or outdoors.

The distributed antenna system receives a base station signal from the base station based on a down-link route and performs processing such as amplification on the signal. Then, the distributed antenna system transmits the signal-processed base station signal to a user terminal in a service region, performs processing such as amplification on a terminal signal transmitted from the user terminal in the service region based on an up-link route, and then transmits the signal to the base station. To implement the relay function of the distributed antenna system, it essential to match the signals transmitted and received between the base station and the dispersion antenna system, for example, adjust signal power. To this end, a base station signal matching device has been used.

The base station signal matching device adjusts the base station signal having a high power level at the down-link route to an appropriate power level required for the distributed antenna system. In this case, a significant amount of heat is generated, which damages the base station signal matching device and shortens the lifespan. Accordingly, there is a need for a solution capable of efficiently dissipating the heat.

FIG. 1 is a cross-sectional view illustrating a heat-dissipating fin structure of a general heat-dissipating unit applied to an antenna apparatus in the related art.

As illustrated in FIG. 1, the heat-dissipating unit in the related art technology includes: a heat-dissipating cover 10 having an inner surface exposed to a predetermined space (TS, thermal space) in which heat exists; and a plurality of heat-dissipating fins 20 coupled to an outer surface of a heat-dissipating cover 10. The plurality of heat-dissipating fins 20 each has a vertical cross-section having an approximately straight line shape.

The heat in the predetermined space TS is generated from electrical components (not illustrated) configured as heating elements and thermally transferred by conduction through an inner surface of the heat-dissipating cover 10 made of a thermally conductive material. The heat is dissipated to the outside through the plurality of heat-dissipating fins 20 coupled to the outer surface of the heat-dissipating cover 10.

However, as illustrated in FIG. 1, the heat-dissipating fin structure of the general heat-dissipating unit configured as described above has a problem in that heat stagnation occurs on a connection part (see reference numeral "A" in FIG. 1) between the heat-dissipating fin 20 and the heat-dissipating cover 10, which degrades heat-dissipating performance.

This problem occurs because outside air does not appropriately flow into the part A where the heat stagnation occurs. That is, the heat-dissipating fin structure of the general heat-dissipating unit in the related art has a structure in which the outside air may flow only when flow directions of outside air between the adjacent heat-dissipating fins 20 are coincident with each other. Therefore, a width of the single heat-dissipating fin 20 blocks the flow of outside air, such that the outside air hardly flows. For this reason, the heat, which needs to be dissipated, stagnates on the connection part with the heat-dissipating cover 10, which degrades heat-dissipating performance.

DISCLOSURE

Technical Problem

The present invention has been made in an effort to solve the above-mentioned problems, and an object of the present invention is to provide a cooling device for an antenna apparatus having a plurality of wave heat-dissipating fins provided such that outside air may flow into the plurality of wave heat-dissipating fins in all directions except for a side closed by a heat-dissipating cover.

Another object of the present invention is to provide a cooling device for an antenna apparatus capable of facilitating arrangement design of a plurality of wave heat-dissipating fins.

Technical problems of the present invention are not limited to the aforementioned technical problems, and other technical problems, which are not mentioned above, may be clearly understood by those skilled in the art from the following descriptions.

Technical Solution

An exemplary embodiment of the present invention provides a cooling device for an antenna apparatus, the cooling device including: a heat-dissipating cover having an inner surface exposed to a predetermined space in which heat exists, and an outer surface exposed to the outside where outside air flows; and a plurality of wave heat-dissipating fins disposed on the outer surface of the heat-dissipating cover so as to perform thermal conduction, the plurality of wave heat-dissipating fins extending to define curved surfaces continuously formed from the outer surface of the heat-dissipating cover to any height.

In this case, the plurality of wave heat-dissipating fins may be disposed such that outer ends at points farthest from the outer surface of the heat-dissipating cover are kept rotated at a predetermined angle in the same direction which is any one direction.

In addition, one end of each of the plurality of wave heat-dissipating fins may be in thermal contact with and fixed to the outer surface of the heat-dissipating cover.

In addition, the plurality of wave heat-dissipating fins may be disposed in multiple rows on the outer surface of the heat-dissipating cover, and the cooling device may further include a mounting thermal conduction plate simultaneously connected to the plurality of wave heat-dissipating fins disposed in one row or two or more rows and configured to mediate the thermal contact and fixing between the plurality of wave heat-dissipating fins and the outer surface of the heat-dissipating cover.

In addition, the mounting thermal conduction plate may include: at least one vertical flange disposed perpendicular to the outer surface of the heat-dissipating cover so as to connect the ends of the plurality of wave heat-dissipating fins disposed in one row or two or more lows; and a horizontal flange bent and extending from a tip of at least one vertical flange in parallel with the outer surface of the heat-dissipating cover.

In addition, the horizontal flange may be fixedly seated in a seating groove formed in the outer surface of the heat-dissipating cover, and an outer surface of the horizontal flange may be horizontally matched with and fixedly seated on the outer surface of the heat-dissipating cover.

In addition, the plurality of wave heat-dissipating fins may each be manufactured by twisting a rectangular board elongated upward and downward and made of a conductive material in one direction based on a vertical central axis.

In addition, horizontal cross-sections of the plurality of wave heat-dissipating fins corresponding to any height from the outer surface of the heat-dissipating cover may be arranged in a predetermined direction, which is the same direction.

In addition, the plurality of wave heat-dissipating fins may be arranged to have the same spacing distance.

In addition, a left end and a right end of each of the plurality of wave heat-dissipating fins may extend in a spiral shape in a direction away from the outer surface of the heat-dissipating cover.

In addition, each of the plurality of wave heat-dissipating fins may be formed by being twisted so that the other end spaced apart from the outer surface of the heat-dissipating cover at a longest distance is rotated at 180 degrees or more about a vertical central axis with respect to one end connected to the outer surface of the heat-dissipating cover.

Advantageous Effects

According to the embodiment of the cooling device for an antenna apparatus according to the present invention, the outside air easily flows into the plurality of wave heat-dissipating fins from the outside in all directions, thereby improving the overall heat-dissipating performance.

According to the embodiment of the cooling device for an antenna apparatus according to the present invention, one surface and the other surface of each of the plurality of wave heat-dissipating fins are formed so that the outside air flows in all directions at least according to the height at which the plurality of wave heat-dissipating fins is spaced apart from the heat-dissipating cover. Therefore, it is possible to facilitate the arrangement design of the plurality of wave heat-dissipating fins.

DESCRIPTION OF MAIN REFERENCE NUMERALS OF DRAWINGS

Figure 1:
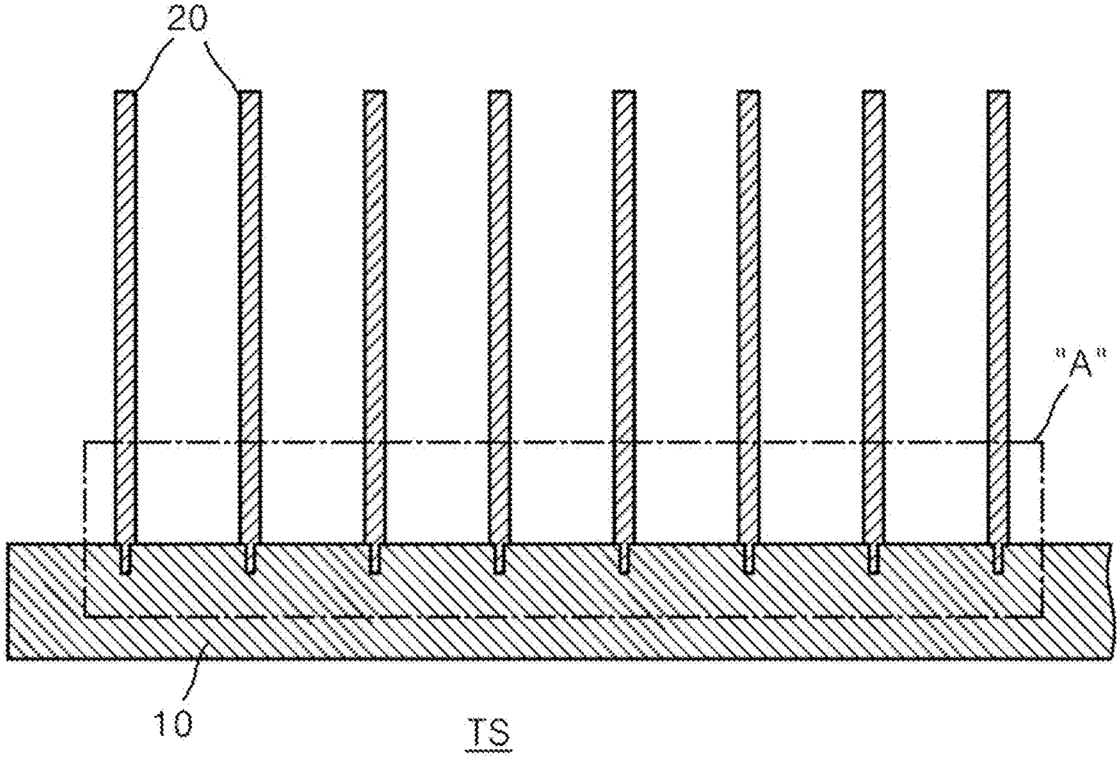
FIG. 1 is a cross-sectional view illustrating a heat-dissipating fin structure of a general heat-dissipating unit in the related art.

100: Cooling device
101: Casing unit
103: Printed circuit board
105: Heating element
110: Heat-dissipating cover
115: Seating groove
120: Wave heat-dissipating fin
130: Mounting thermal conduction plate
131, 131*a*, 131*b*: Vertical flange
132: Horizontal flange
TS: Predetermined space (thermal space)
C: Vertical central axis

BEST MODE

An embodiment of a cooling device for an antenna apparatus according to the present invention will be described in detail with reference to the exemplary drawings.

In giving reference numerals to constituent elements of the respective drawings, it should be noted that the same constituent elements will be designated by the same reference numerals, if possible, even though the constituent elements are illustrated in different drawings. Further, in the following description of the embodiments of the present invention, a detailed description of related publicly-known configurations or functions will be omitted when it is determined that the detailed description obscures the understanding of the embodiments of the present invention.

In addition, the terms first, second, A, B, (a), and (b) may be used to describe constituent elements of the exemplary embodiments of the present invention. These terms are used only for the purpose of discriminating one constituent element from another constituent element, and the nature, the sequences, or the orders of the constituent elements are not limited by the terms. Further, unless otherwise defined, all terms used herein, including technical or scientific terms, have the same meaning as commonly understood by those skilled in the art to which the present invention pertains. The terms such as those defined in commonly used dictionaries should be interpreted as having meanings consistent with meanings in the context of related technologies and should not be interpreted as ideal or excessively formal meanings unless explicitly defined in the present application.

Figure 2:
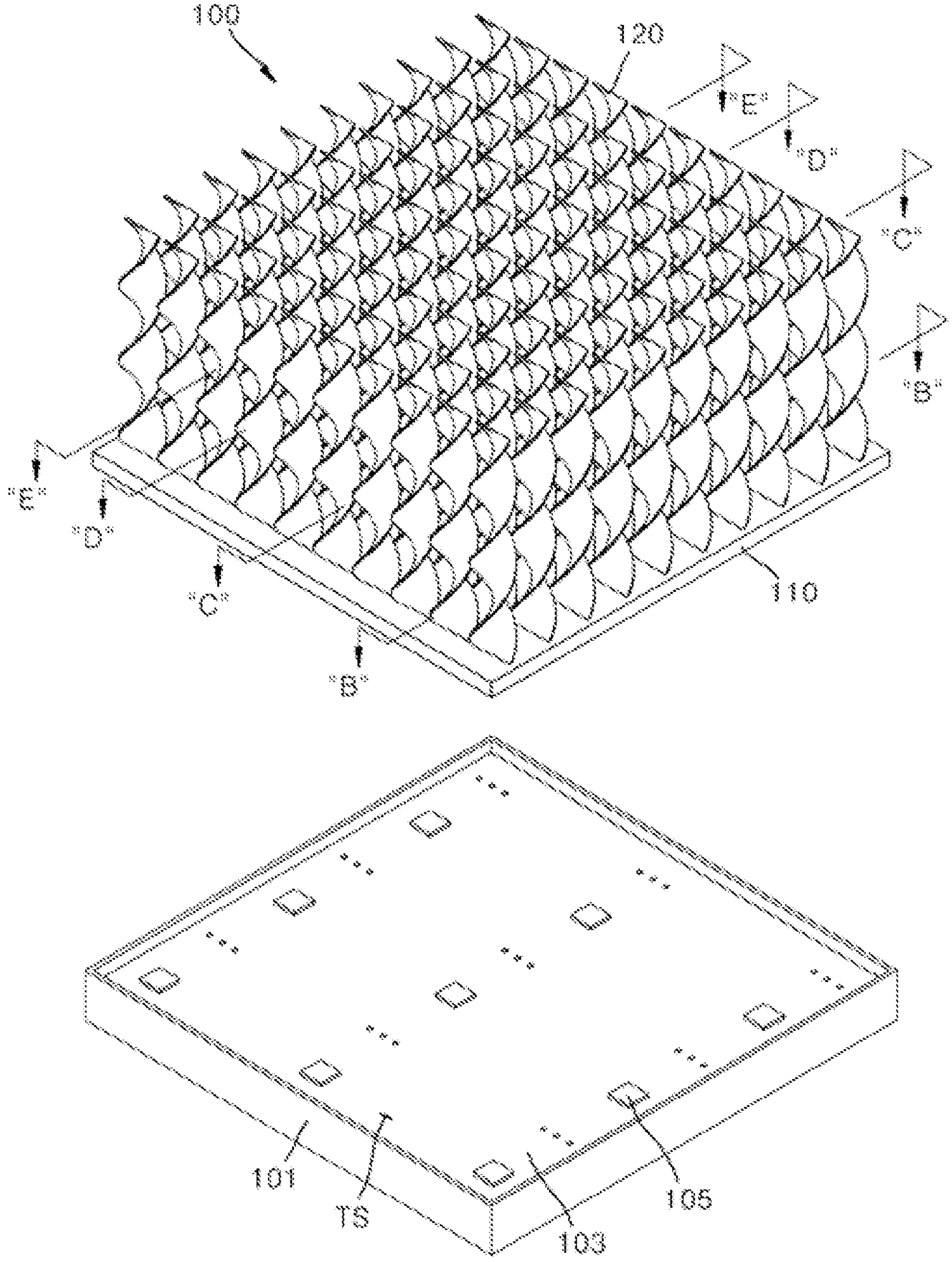
FIG. 2 is a perspective view illustrating an embodiment of a cooling device for an antenna apparatus according to the present invention.
Figure 3A:
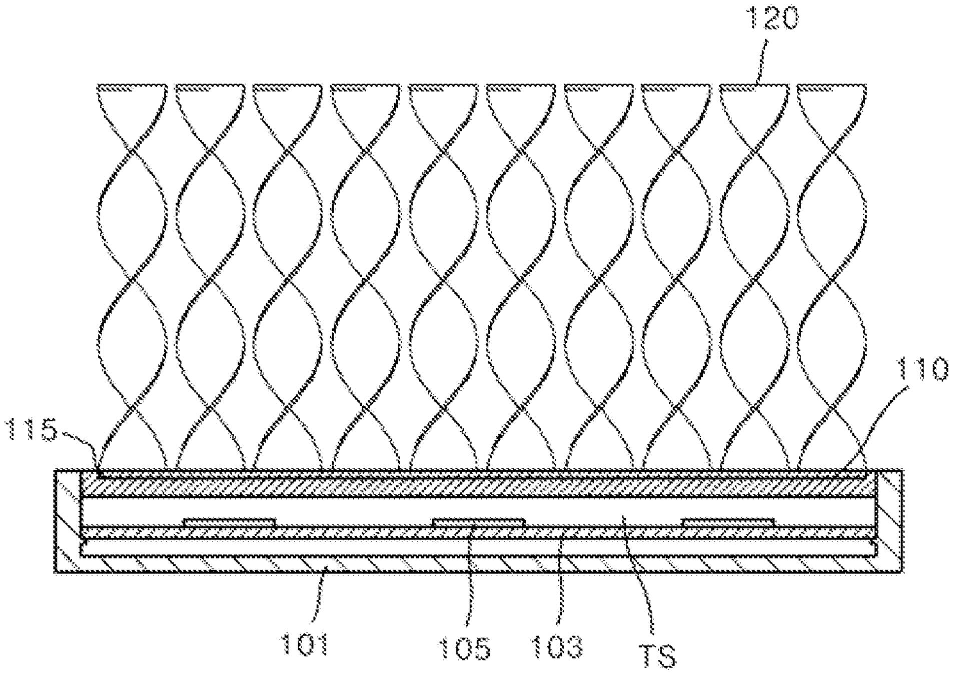
FIG. 3A is a front view of FIG. 2.
Figure 3B:
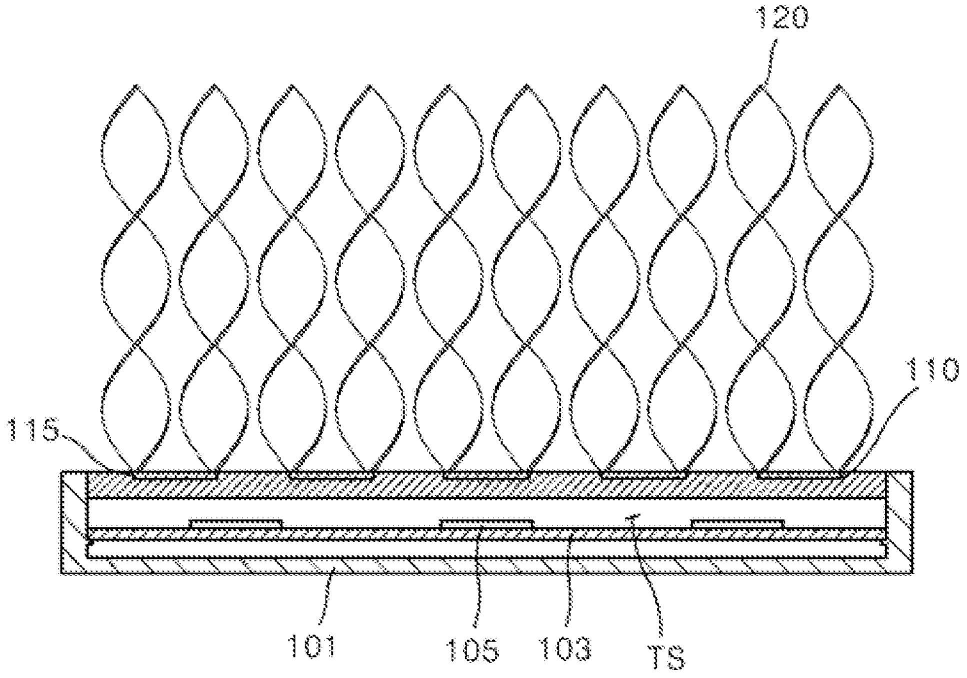
FIG. 3B is a side view of FIG. 2.
Figure 4:
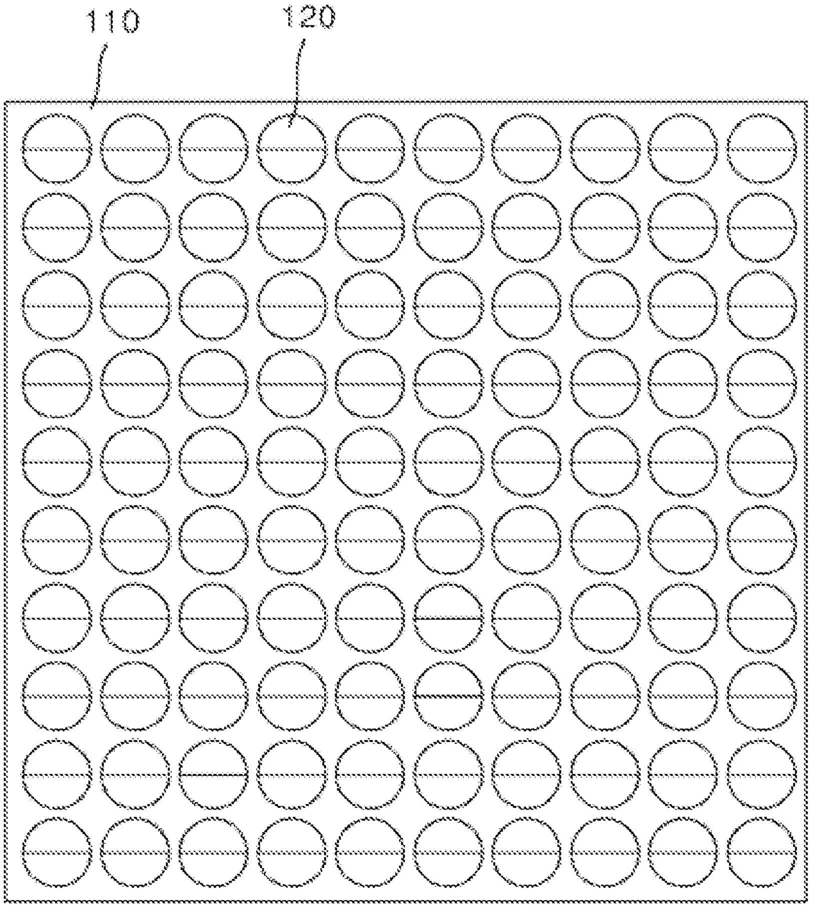
FIG. 4 is a top plan view of FIG. 2.
Figure 5:
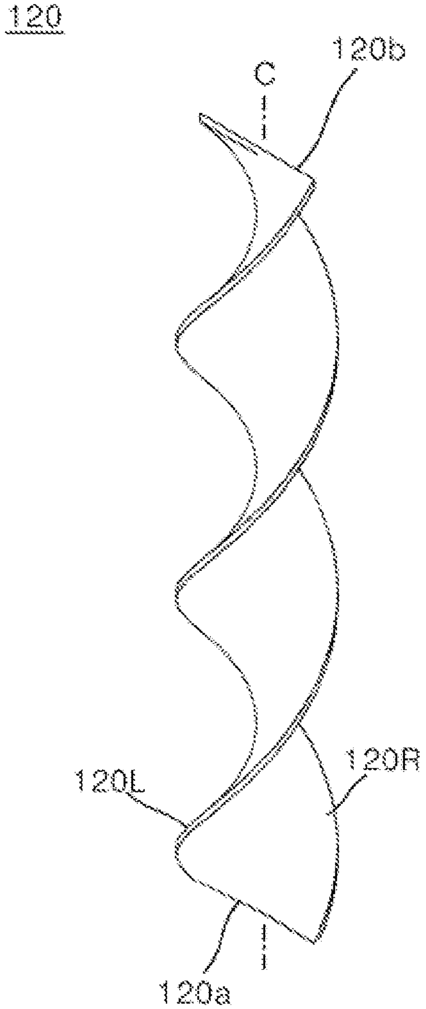
FIG. 5 is a perspective view illustrating a wave heat-dissipating fin among the components in FIG. 2.
Figure 6:
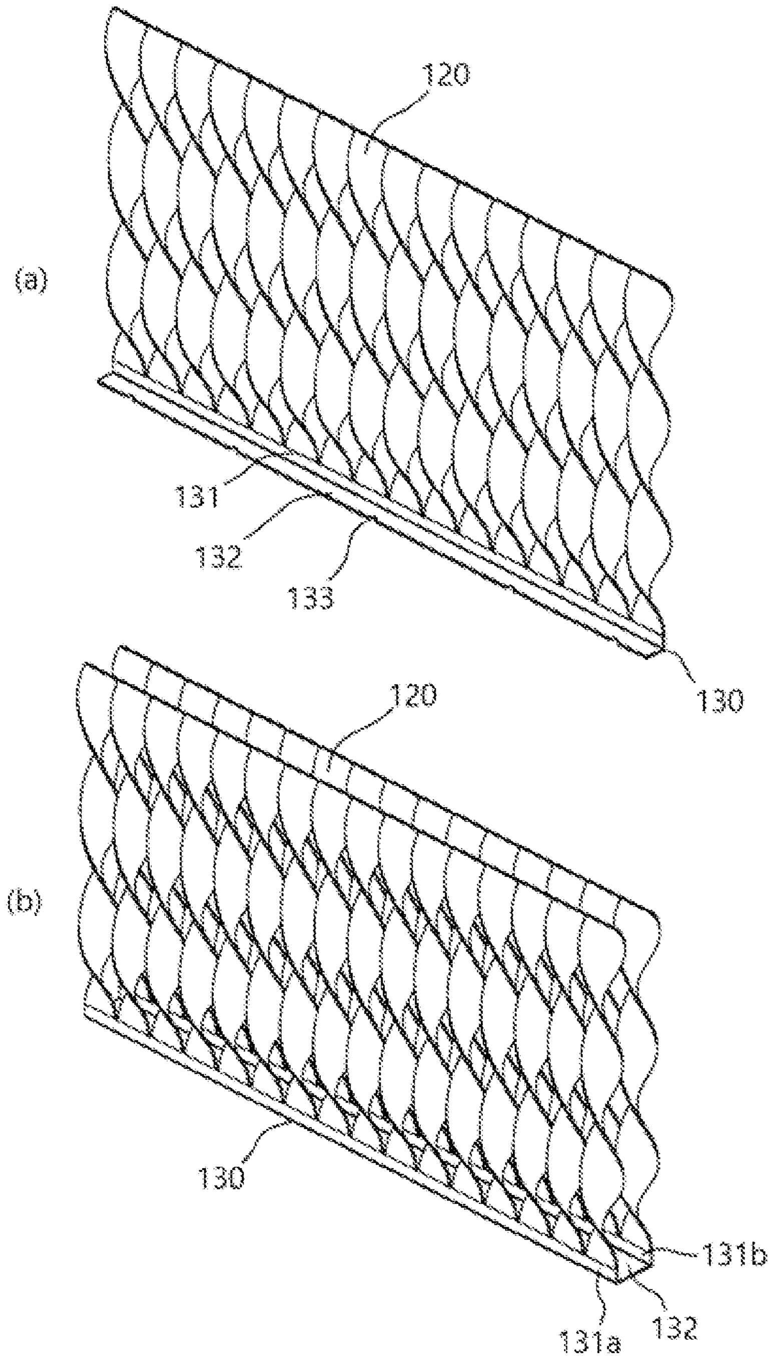
FIG. 6 is a perspective view illustrating various embodiments of the wave heat-dissipating fins among the components in FIG. 2.

FIG. 2 is a perspective view illustrating an embodiment of a cooling device for an antenna apparatus according to the present invention, FIG. 3A is a front view of FIG. 2, FIG. 3B is a side view of FIG. 2, FIG. 4 is a top plan view of FIG. 2, FIG. 5 is a perspective view illustrating a wave heat-dissipating fin among the components in FIG. 2, and FIG. 6 is a perspective view illustrating various embodiments of the wave heat-dissipating fins among the components in FIG. 2.

As illustrated in FIGS. 2 to 5, a cooling device 100 for an antenna apparatus according to the embodiment of the present invention includes: a heat-dissipating cover 110 having an inner surface exposed to a predetermined space in which heat exists (or, a 'thermal space', hereinafter, denoted by reference numeral 'TS'), and an outer surface exposed to the outside where outside air flows; and a plurality of wave heat-dissipating fins 120 disposed on an outer surface of the heat-dissipating cover 110.

In this case, as illustrated in FIG. 2, the predetermined space TS may be defined as an internal space of the casing unit 101 provided to install and protect a printed circuit board (PCB) 103 on which electrical components, i.e., a plurality of exothermic elements 105, are mounted. In a case in which the plurality of exothermic elements 105 are provided on the antenna apparatus, the plurality of exothermic elements 105 may be antenna-related electrical components such as a power amplifier (PA), a field-programmable gate array (FPGA), or the like.

The heat-dissipating cover 110 may be coupled to one open side of the casing unit 101 and disposed to cover one side of the printed circuit board 103 on which the electrical components, i.e., the plurality of exothermic elements, are mounted. As described above, the predetermined space TS is defined between an inner surface of the heat-dissipating cover 110 and the printed circuit board 103. The predetermined space TS is a space in which the electrical components, i.e., the plurality of exothermic elements 105, generate heat.

As illustrated in FIGS. 2 to 5, the plurality of wave heat-dissipating fins 120 may be disposed in multiple rows so as to transfer heat to an outer surface of the heat-dissipating cover 110. Further, the plurality of wave heat-dissipating fins 120 may extend by a preset spacing distance from the outer surface of the heat-dissipating cover 110. In this case, the plurality of wave heat-dissipating fins 120 not only extends by the preset spacing distance from the outer surface of the heat-dissipating cover 110, but also forms curved surfaces continuously formed to any spacing distance from the outer surface of the heat-dissipating cover 110.

In addition, the plurality of wave heat-dissipating fins 120 may each have a horizontal cross-section (hereinafter, referred to as an 'outer cross-section') spaced apart from the outer surface of the heat-dissipating cover 110 at any spacing distance, and the outer cross-section may have a straight-line shape in a state of being rotated at a predetermined angle in any one direction with respect to a horizontal cross-section (hereinafter, referred to as an 'inner cross-section') of the outer surface (or a portion adjacent to the outer surface) of the heat-dissipating cover 110.

More specifically, as illustrated in FIGS. 2 and 4, the plurality of wave heat-dissipating fins 120 may each have one end fixed to the outer surface of the heat-dissipating cover 110.

For example, as illustrated in FIG. 2, when the heat-dissipating cover 110 is provided in the form of an approximately rectangular board made of a conductive material, the plurality of wave heat-dissipating fins 120 may be arranged in two or more rows or two or more columns in a longitudinal direction or a width direction on the outer surface of the heat-dissipating cover 110. In the embodiment of the present invention, the heat-dissipating cover 110 is provided in the form of a square board, and the plurality of wave heat-dissipating fins 120 is arranged in 10 rows and 10 columns. However, it should be noted that the present invention is not necessarily limited to the above-mentioned arrangement.

In this case, the plurality of wave heat-dissipating fins 120 may be arranged to have the same spacing distance. However, the present invention is not limited thereto. The plurality of wave heat-dissipating fins 120 may be arranged and designed to have different spacing distances in accordance with the arrangement positions or the amount of heat generation of the electrical components, i.e., the exothermic elements 105 disposed in the casing unit 101.

Meanwhile, as illustrated in FIG. 2, the plurality of wave heat-dissipating fins 120 may each have one end (a lower portion in FIG. 2) fixed to and being in thermal contact with the outer surface of the heat-dissipating cover 110. In this case, the expression 'fixed to and being in thermal contact with' means all the concepts in which thermal conduction is performed through contact according to the characteristics of materials.

More specifically, as illustrated in FIGS. 2 to 4, the plurality of wave heat-dissipating fins 120 may be disposed in the plurality of rows and columns. In this case, as illustrated in FIG. 6, the cooling device 100 for an antenna apparatus according to the embodiment of the present invention may further include a mounting thermal conduction plate 130 simultaneously connected to the plurality of wave heat-dissipating fins 120 disposed in one row (see FIG. 6A) or two or more rows (see FIG. 6B) and configured to mediate the thermal contact and fixing between the plurality of wave heat-dissipating fins 120 and the outer surface of the heat-dissipating cover 110.

As illustrated in FIG. 6A, the mounting thermal conduction plate 130 may include: a vertical flange 131 configured to connect the ends of the plurality of wave heat-dissipating fins disposed in one row; and a horizontal flange 132 bent and extending at a tip of the vertical flange 131 so as to be parallel to the outer surface of the heat-dissipating cover 110.

In addition, as illustrated in FIG. 6B, the mounting thermal conduction plate 130 may include: first and second vertical flanges 131*a* and 131*b* configured to connect the ends of the plurality of wave heat-dissipating fins 120 disposed in two rows; and a horizontal flange 132 configured to connect tips of the first and second vertical flanges 131*a* and 131*b* and bent and extending to be parallel to the outer surface of the heat-dissipating cover 110.

In this case, the horizontal flange 132 of the mounting thermal conduction plate 130 may be seated on and fixed to a seating groove 115 (see FIGS. 3A and 3B) formed in advance in the outer surface of the heat-dissipating cover 110. In this case, an outer surface of the horizontal flange 132 may be horizontally matched with and fixedly seated on the outer surface of the heat-dissipating cover 110. Therefore, flow resistance of outside air introduced between the plurality of wave heat-dissipating fins 120 is minimized, thereby preventing deterioration in heat-dissipating performance.

A method of fixing the horizontal flange 132 to the seating groove 115 of the heat-dissipating cover 110 may be any one of a welding method and a screw-fastening method. However, the screw-fastening method may be used to fix the horizontal flange 132 so that the horizontal flange 132 is easily replaceable in consideration of the amount of heat generation of the exothermic elements 105 disposed in the predetermined space TS. To this end, as illustrated in FIG. 6A, the horizontal flange 132 may have a plurality of screw fastening holes 133 so that the horizontal flange 132 is screw-fastened to the heat-dissipating cover 110.

Meanwhile, although not illustrated in the drawings, the seating groove 115 is formed in the heat-dissipating cover 110 and provided in the form of a hole that communicates with the predetermined space TS of the heat-dissipating cover 110. An inner surface of the horizontal flange 132 of the mounting thermal conduction plate 130 is installed in the seating groove 115 provided in the form of a hole, such that the inner surface of the horizontal flange 132 is fixedly seated to be exposed to the predetermined space TS. The exothermic elements 105 in the predetermined space TS may be thermally in direct surface contact with the horizontal flange 132. The plurality of wave heat-dissipating fins 120 and the exothermic elements 105 having a large amount of heat generation may be in direct contact with one another and dissipate heat in a thermal conduction manner, thereby achieving the higher heat-dissipating performance and effect.

The plurality of wave heat-dissipating fins 120 may each be manufactured by twisting a rectangular board elongated upward and downward and made of a thermally conductive material in one direction based on a vertical central axis C.

Therefore, as illustrated in FIG. 5, a left end 120L and a right end 120R of each of the plurality of wave heat-dissipating fins may extend in a direction away from the outer surface of the heat-dissipating cover 110 and extend in a spiral shape.

In this case, each of the plurality of wave heat-dissipating fins 120 may be formed by being twisted so that the other end 120*b* spaced apart from the outer surface of the heat-dissipating cover 110 at a longest distance is rotated at 180 degrees or more about the vertical central axis C with respect to one end 120*a* connected to the outer surface of the heat-dissipating cover 110. Because the twisting angle of each of the plurality of wave heat-dissipating fins 120 is '180 degrees or more', each of the plurality of wave heat-dissipating fins 120 may be rotated by 360 degrees (i.e., one rotation) or more. In this case, the curved surface may be necessarily formed in the direction away from the outer surface of the heat-dissipating cover 110.

Therefore, as illustrated in FIG. 4, the left and right ends of each of the plurality of wave heat-dissipating fins 120 each have a predetermined circular shape when viewed from above to immediately below. A diameter of each of the circles may be equal to a width of the rectangular board which is the base material of each of the wave heat-dissipating fins 120.

In the cooling device according to the embodiment of the present invention having the above-mentioned configuration, the outer cross-section of each of the plurality of wave heat-dissipating fins 120 may have a straight-line shape at a first height equal to a height from the outer surface of the heat-dissipating cover 110. Further, the outer cross-section of each of the plurality of wave heat-dissipating fins 120 may also have a straight-line shape at a second height higher than the first height. However, the present invention is not necessarily limited to the configuration in which the outer cross-section of each of the plurality of wave heat-dissipating fins 120 has a straight-line shape at the same height. A cut surface of the curved surface may have a curved line shape within a range in which outside air easily flows inside the plurality of wave heat-dissipating fins 120.

However, the shape of the outer cross-section of each of the plurality of wave heat-dissipating fins 120 at the first height and shape of the outer cross-section of each of the plurality of wave heat-dissipating fins 120 at the second height may define a predetermined angle or equally overlap each other on an x-y coordinate, but extend to define the curved surface in an upward/downward direction (i.e., z-coordinate). In this case, one surface or the other surface of each of the plurality of wave heat-dissipating fins 120 may necessarily have a curved shape without a stepped portion. This is to prevent the occurrence of flow resistance caused by a stepped portion when outside air flows between the plurality of adjacent wave heat-dissipating fins 120, as described below. In addition, when the plurality of wave heat-dissipating fins 120 each define the curved surface in the upward/downward direction, the outside air introduced from outside to inside naturally flows along the curved surface upward (i.e., in the direction away from the outer surface of the heat-dissipating cover 110) or downward (i.e., in the direction toward the outer surface of the heat-dissipating cover 110) without flow resistance. Therefore, the outside air may actively circulate over all the plurality of wave heat-dissipating fins 120.

Further, the outer cross-sections of the plurality of wave heat-dissipating fins 120, which are positioned at the same height from the outer surface of the heat-dissipating cover 110, may be arranged in a predetermined direction, i.e., the same direction. Further, the outer cross-sections of the plurality of wave heat-dissipating fins 120 at the same height may have any one of the straight-line shape and the curved-line shape of the cut surface of the curved surface.

Therefore, the outside air positioned outside the plurality of wave heat-dissipating fins 120 may flow in different directions (in all directions) according to the distance away from the outer surface of the heat-dissipating cover 110 (i.e., according to the height of the wave heat-dissipating fin 120). Therefore, the flow rate of the outside air may increase.

When the flow rate of the outside air flowing into the plurality of wave heat-dissipating fins 120 increases, a problem of the heat stagnation at the portion close to the outer surface of the heat-dissipating cover 110 may be solved, which makes it possible to greatly improve heat-dissipating performance in comparison with a heat-dissipating fin structure of a general heat-dissipating unit.

Figure 7:
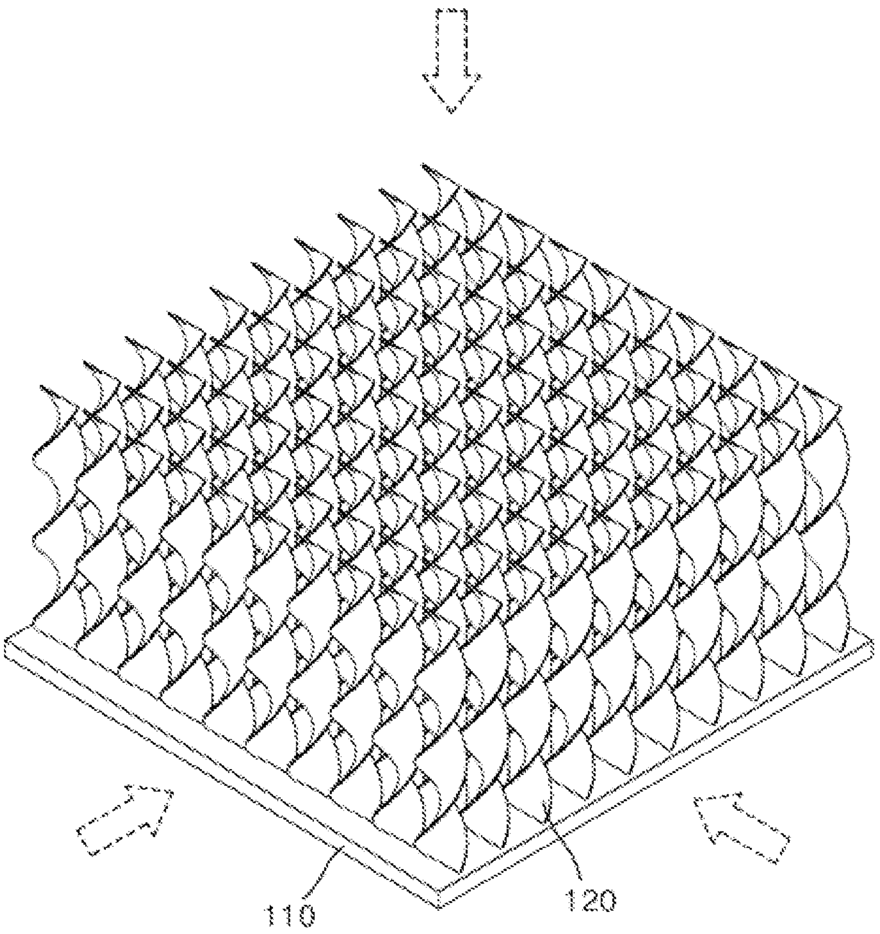
FIG. 7 is a perspective view illustrating a state in which outside air flows in through the heat-dissipating cover and the plurality of wave heat-dissipating fins.
Figure 8:
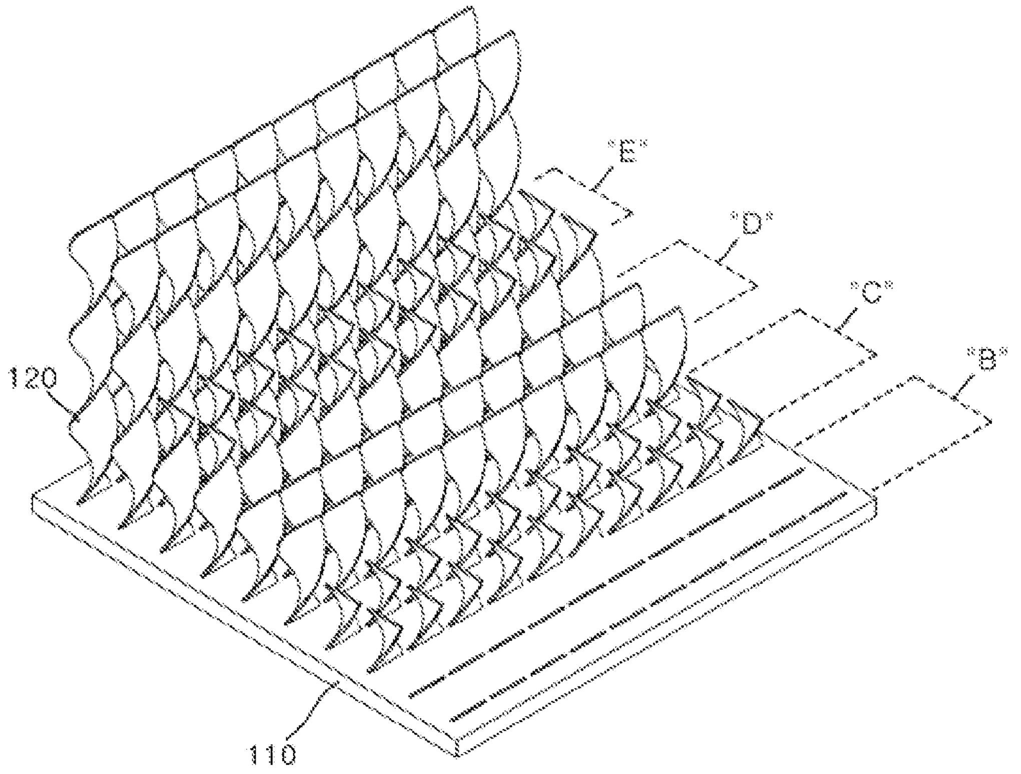
FIG. 8 is cut-away perspective views taken along line B-B, line C-C, line D-D, and line E-E in FIG. 2.
Figure 9:
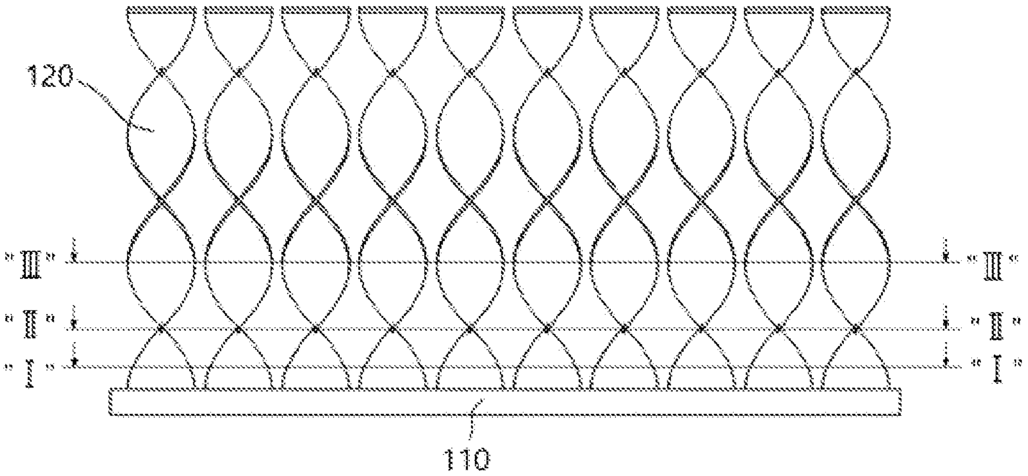
FIG. 9 is a front view of the cooling device for an antenna apparatus according to the present invention.
Figure 10A:
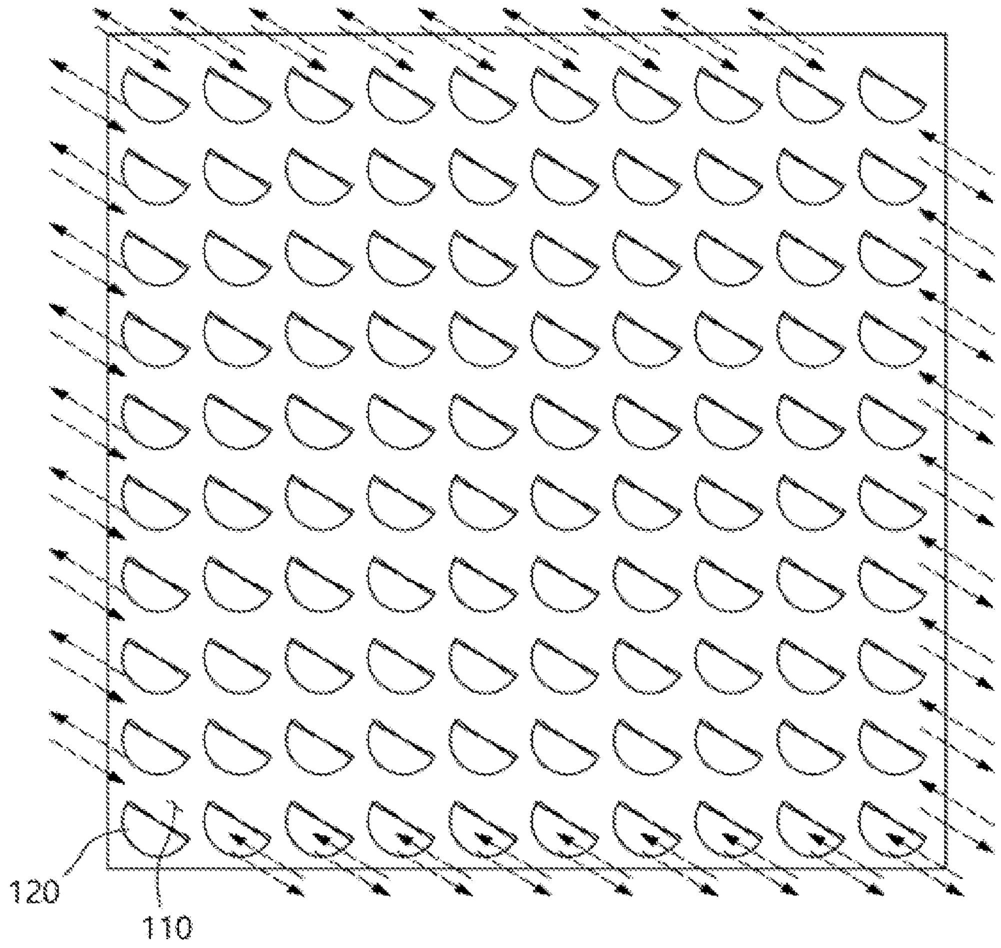
FIGS. 10A to 10C are cross-sectional views taken along line 'I-I', 'II-II', and 'III-III' in FIG. 9 and illustrating an inflow of the outside air.
Figure 10B:
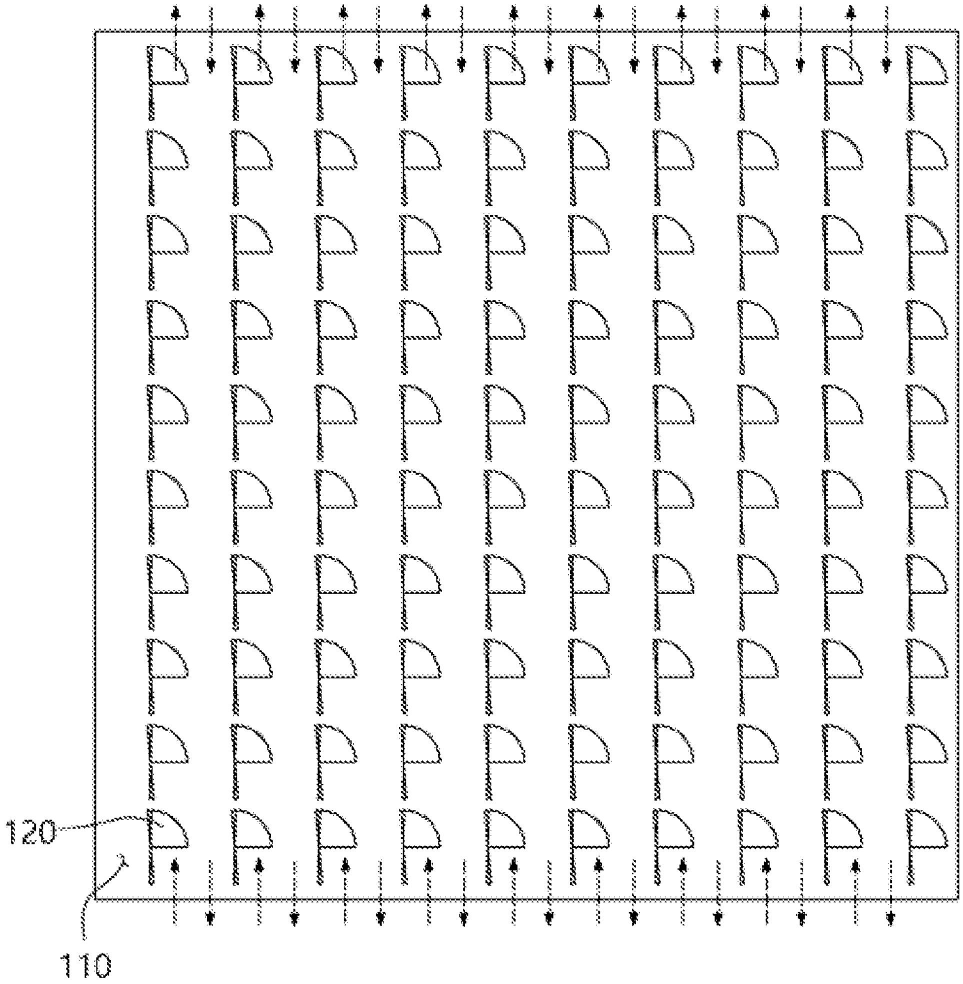
Figure 10C:
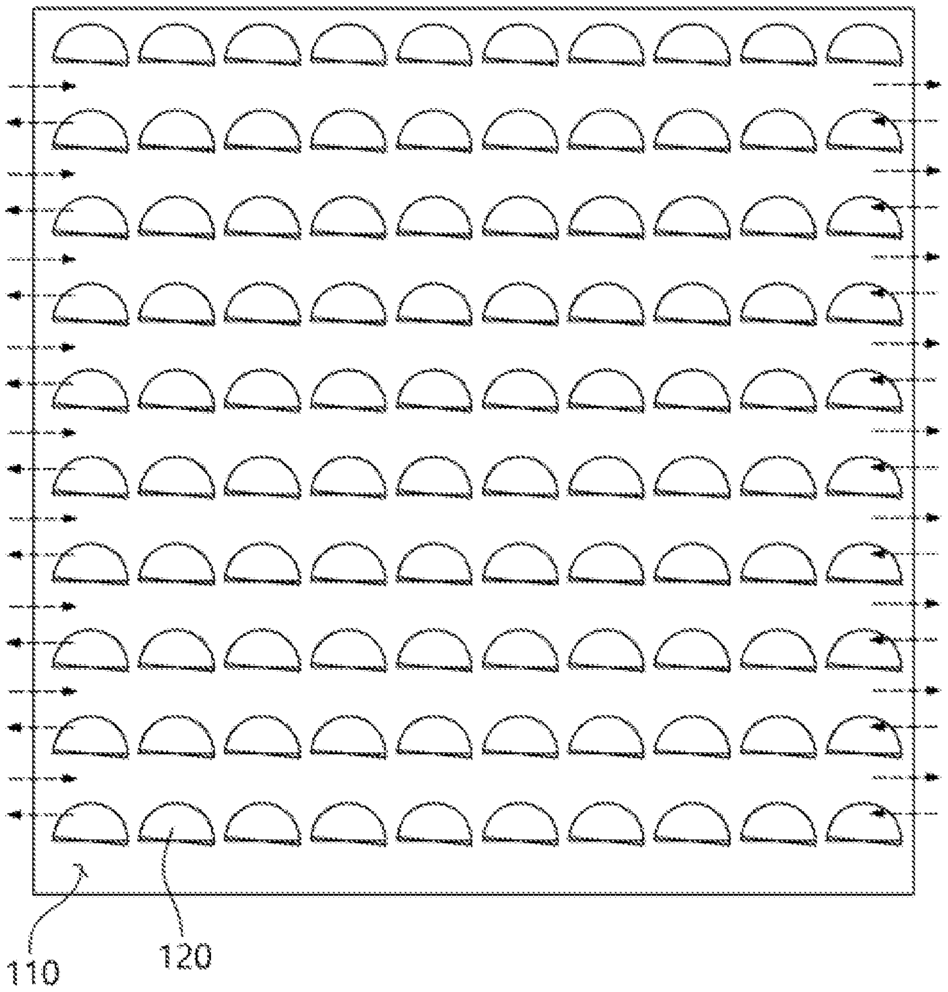

FIG. 7 is a perspective view illustrating a state in which outside air is introduced through the heat-dissipating cover and the plurality of wave heat-dissipating fins, FIG. 8 is a cut-away perspective view taken along line B-B, C-C, D-D, and E-E in FIG. 2, FIG. 9 is a front view of the cooling device for an antenna apparatus according to the present invention, and FIGS. 10A to 10C are cross-sectional views taken along line 'I-I', 'II-II', and 'III-III' in FIG. 9 and illustrating an inflow of the outside air.

A heat-dissipating operation of the cooling device for an antenna apparatus according to the present invention configured as described above will be briefly described.

First, referring to FIGS. 7 and 8, when predetermined operating heat is generated from the electrical components provided as the heating elements 105 configured to perform the function of the antenna, the heat is trapped in the predetermined space TS defined between the inner surface of the heat-dissipating cover 110 of the printed circuit board 103 disposed in the casing unit 101. The trapped heat is transferred through the inner surface of the heat-dissipating cover 110 made of a thermally conductive material.

The heat transferred to the outer surface of the heat-dissipating cover 110 is transferred to the plurality of wave heat-dissipating fins 120 disposed on the outer surface of the heat-dissipating cover 110, and smooth heat dissipation may be performed by outside air introduced between the wave heat-dissipating fins 120 adjacent to the outer surface of the heat-dissipating cover 110 at any spacing distance.

For example, as illustrated in FIG. 8, line B-B, line C-C, line D-D, and line E-E are cross-sectional lines defined at different spacing distances with respect to the outer surface of the heat-dissipating cover 110. The outer cross-section of the wave heat-dissipating fin 120, which is defined by the cross-sectional line at each portion, has a straight-line shape, and the outer cross-section of the wave heat-dissipating fin 120, which is adjacent to the above-mentioned heat-dissipating fin 120, also has a straight-line shape parallel to the above-mentioned straight-line shape. Therefore, the outside air may be easily introduced between the plurality of wave heat-dissipating fins 120 in all directions, thereby greatly improving heat-dissipating performance.

More specifically, as illustrated in FIGS. 9 and 10A, at a height of line 'I-I' spaced apart from and closest to the outer surface of the heat-dissipating cover 110, the tip portions of the plurality of wave heat-dissipating fins 120 are arranged in a straight-line shape side by side in an oblique line direction, and the outside air may flow into or out of the portions between the adjacent wave heat-dissipating fins 120 in the oblique line direction.

In addition, as illustrated in FIGS. 9 and 10B, at a height of line 'II-II' further spaced apart from the outer surface of the heat-dissipating cover 110 than line 'I-I', the tip portions of the plurality of wave heat-dissipating fins 120 have blocking shapes so that the outside air hardly flows in a leftward/rightward direction of the heat-dissipating cover 110 based on the drawings. However, the tip portions of the plurality of wave heat-dissipating fins 120 are arranged side by side in a straight-line shape in a forward/rearward direction of the heat-dissipating cover 110 based on the drawings, such that the outside air may flow into or out of the portions between the adjacent wave heat-dissipating fins 120 in the forward/rearward direction.

Further, as illustrated in FIGS. 9 and 10C, at a height of line 'III-III' spaced apart from and farthest from the outer surface of the heat-dissipating cover 110, the tip portions of the plurality of wave heat-dissipating fins 120 have blocking shapes so that the outside air hardly flows in the forward/rearward direction of the heat-dissipating cover 110 based on the drawings. However, the tip portions of the plurality of wave heat-dissipating fins 120 are arranged side by side in a straight-line shape in the leftward/rightward direction of the heat-dissipating cover 110 based on the drawings, such that the outside air may flow into or out of the portions between the adjacent wave heat-dissipating fins 120 in the leftward/rightward direction.

As described above, according to the embodiment of the cooling device for an antenna apparatus according to the present invention, the plurality of wave heat-dissipating fins 120 is provided to define continuous curved surfaces from the outer surface of the heat-dissipating cover 110 to any spacing point so that the outside air may naturally flow with respect to the adjacent wave heat-dissipating fins 120. Therefore, it is possible to prevent heat concentration that may occur on the coupling parts between the heat-dissipating cover 110 and the plurality of wave heat-dissipating fins 120. Therefore, it is possible to further improve heat-dissipating performance.

The present invention provides the cooling device for an antenna apparatus having the plurality of wave heat-dissipating fins provided such that the outside air may flow into the plurality of wave heat-dissipating fins in all directions except for a side closed by the heat-dissipating cover. However, the present invention is not necessarily limited by the embodiment, and various modifications of the embodiment and any other embodiments equivalent thereto may of course be carried out by those skilled in the art to which the present invention pertains. Accordingly, the true protection scope of the present invention should be determined by the appended claims.

INDUSTRIAL APPLICABILITY

The present invention provides the cooling device for an antenna apparatus having the plurality of wave heat-dissipating fins provided such that the outside air may flow into the plurality of wave heat-dissipating fins in all directions except for a side closed by the heat-dissipating cover.

The invention claimed is:

1. A cooling device for an antenna apparatus, the cooling device comprising:

a heat-dissipating cover to cover a casing unit, wherein the heat-dissipating cover has an inner surface exposed to a predetermined space in which heat exists, and an outer surface exposed to the outside where outside air flows;

a plurality of wave heat-dissipating fins disposed in two or more rows, wherein the plurality of wave heat-dissipating fins are disposed on the outer surface of the heat-dissipating cover so as to perform thermal conduction, wherein each of the plurality of wave heat-dissipating fins extends to define curved surfaces continuously formed from the outer surface of the heat-dissipating cover to a predetermined height; and a mounting thermal conduction plate connected to the plurality of wave heat-dissipating fins, wherein the mounting thermal conduction plate comprises:

at least two vertical flanges disposed perpendicular to the outer surface of the heat-dissipating cover so as to connect ends of the plurality of wave heat-dissipating fins; and a horizontal flange which connects the at least two vertical flanges and provided in parallel with the outer surface of the heat-dissipating cover, wherein each of the at least two vertical flanges extend from both edges of the horizontal flange.

2. The cooling device of claim 1, wherein each of the plurality of wave heat-dissipating fins is disposed such that outer ends at points farthest from the outer surface of the heat-dissipating cover are kept rotated at a predetermined angle in a predetermined direction.

3. The cooling device of claim 1, wherein one end of each of the plurality of wave heat-dissipating fins is in thermal contact with and fixed to the outer surface of the heat-dissipating cover.

4. The cooling device of claim 3, wherein the plurality of wave heat-dissipating fins are disposed in multiple rows on the outer surface of the heat-dissipating cover, and the mounting thermal conduction plate is configured to mediate the thermal contact and fixing between the plurality of wave heat-dissipating fins and the outer surface of the heat-dissipating cover.

5. The cooling device of claim 4, wherein the horizontal flange is fixedly seated in a seating groove formed in the outer surface of the heat-dissipating cover, and an outer surface of the horizontal flange is horizontally matched with and fixedly seated on the outer surface of the heat-dissipating cover.

6. The cooling device of claim 1, wherein each of the plurality of wave heat-dissipating fins is manufactured by twisting a rectangular board elongated upward and downward and made of a thermally conductive material in one direction based on a vertical central axis.

7. The cooling device of claim 1, wherein horizontal cross-sections of the plurality of wave heat-dissipating fins corresponding to the same height from the outer surface of the heat-dissipating cover are arranged in a predetermined direction, which is the same direction.

8. The cooling device of claim 1, wherein the plurality of wave heat-dissipating fins is arranged to have the same spacing distance.

9. The cooling device of claim 1, wherein a left end and a right end of each of the plurality of wave heat-dissipating fins extend in a spiral shape in a direction away from the outer surface of the heat-dissipating cover.

10. The cooling device of claim 1, wherein each of the plurality of wave heat-dissipating fins is formed by being twisted so that the other end spaced apart from the outer surface of the heat-dissipating cover at a longest distance is rotated at 180 degrees or more about a vertical central axis with respect to one end connected to the outer surface of the heat-dissipating cover.

* * * * *